L. H. BAEKELAND & A. H. PETER.
PROCESS FOR ORGANIC SYNTHESIS.
APPLICATION FILED JULY 10, 1912.
1,190,845.
Patented July 11, 1916.
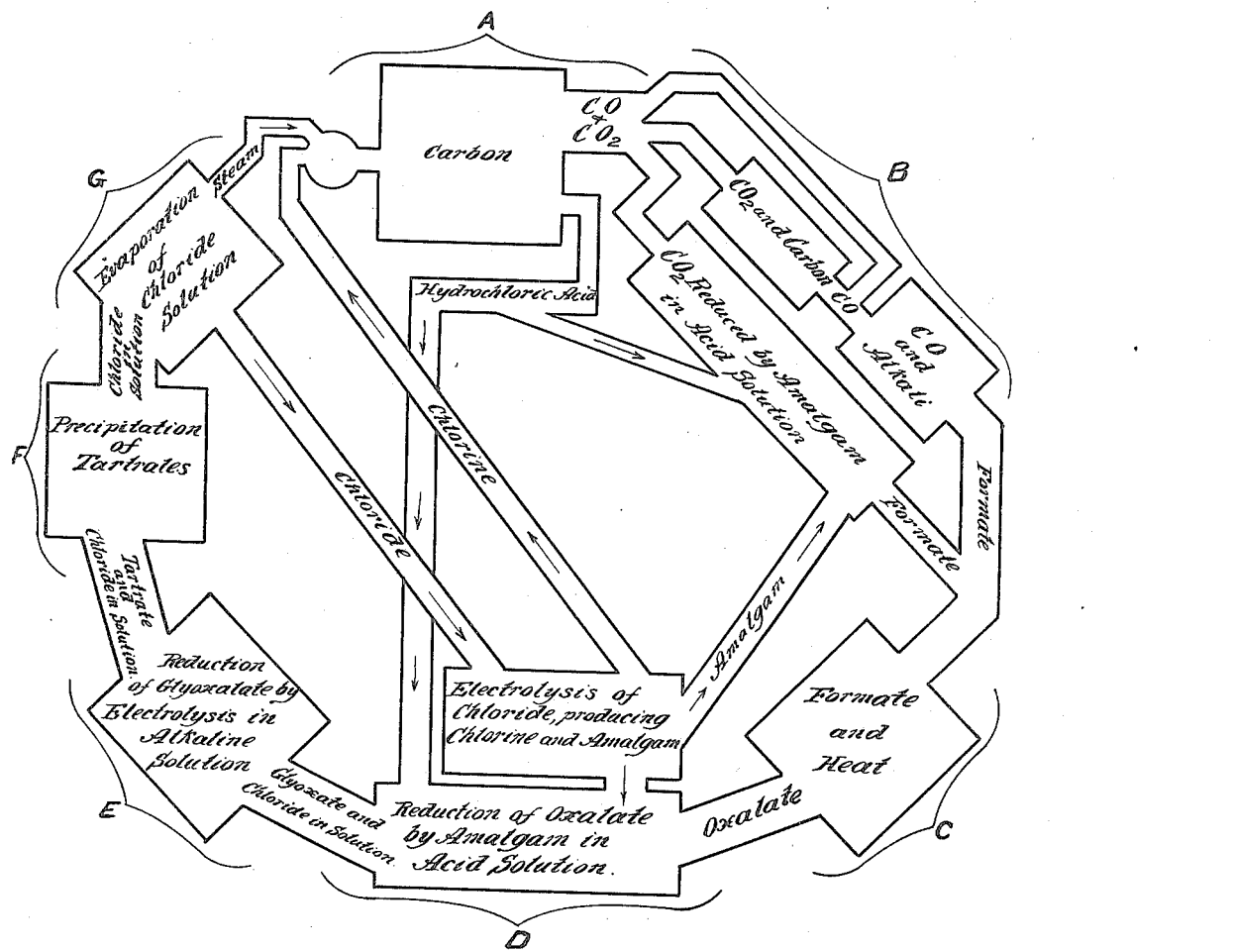

UNITED STATES PATENT OFFICE.

LEO H. BAEKELAND, OF YONKERS, AND ARNOLD H. PETER, OF NEW YORK, N. Y.

PROCESS FOR ORGANIC SYNTHESIS.

1,190,845.   Specification of Letters Patent.   Patented July 11, 1916.

Application filed July 10, 1912. Serial No. 708,588.

*To all whom it may concern:*

Be it known that we, LEO H. BAEKELAND, a citizen of the United States, and residing at Yonkers, in the county of Westchester and State of New York, and ARNOLD H. PETER, a citizen of the Republic of Switzerland, and residing at New York city, in the county and State of New York, have invented a new and useful Improvement in Processes for Organic Synthesis, of which the following is a specification.

This invention relates to a process for organic synthesis.

Synthetic processes often involve the use of substances which for purposes of this exposition may be considered as including (1) the substance or substances to be transformed which, roughly speaking, may be likened to the raw material of manufacture, and (2) the ancillary substance or substances availed of in effecting the transformations, which may be roughly compared to the machinery of manufacture. The present invention is concerned particularly with the latter and provides a process which may be applied in the transformation of various elements or compounds to more complicated compounds.

The successful commercial practice of organic synthesis has heretofore in many cases been impeded or prevented largely by difficulties in the supply, use and results of the ancillary substances availed of in effecting the transformation. Sometimes the repeated supply of such substances has presented an important or prohibitive element of cost. Sometimes the use of the ancillary substances has involved difficulties in apparatus to such an extent as to render the synthesis technically or economically impracticable on a commercial scale. Again, the result of using these ancillary substances has often been the production of by-products which have complicated the process technically and commercially, in some instances to such an extent as to render the synthesis commercially impracticable.

Among the objects of the present invention is the provision of a process such that the necessity of repeatedly supplying the ancillary substances and the production of by-products are avoided or minimized and such that the organic synthesis may be practised with apparatus which is easily available. These and other objects are accomplished by the invention and application of a cycle of reactions comprising in its most complete form the electrolysis of an alkali or earth alkali chlorid, thus developing an alkali or an amalgam on the cathode and chlorin on the anode, the utilization of the chlorin to produce hydrochloric acid and oxidation, the utilization of the acid to liberate hydrogen from the amalgam in case an amalgam is developed (to hydrogenate or reduce the oxidized product or a further development thereof) and combine with the rest of the amalgam or alkali to form a chlorin. Reference is made to the development of an alkali or an amalgam on the cathode because, as will appear by illustrations, under some circumstances it is desirable to form an amalgam to carry the hydrogen to the reduction chamber and under other circumstances the formation of an amalgam is unnecessary and the hydrogen may be directly presented to the substance to be reduced. As hereinafter illustrated under various circumstances the process may be practised in forms less complete than that just mentioned, as, for example, by omitting either the oxidizing or acid-forming office of the chlorin and using it to perform only one of said offices, obtaining the results of the performance of its other office elsewhere, and it is to be understood that such an omission would not be a departure from the scope of the protection sought in some of the claims, which are not to be understood as limited by the completeness of this exposition. So, too, modifications may be resorted to in the practice of the process, as, for instance, the chlorin, instead of being used to react with water and carbon, may be made to react with other substances to produce, directly or indirectly, hydrochloric acid, and the oxygen may be taken from the air.

The process is hereinafter described as applied to the manufacture of tartaric acids and their compounds, and simpler compounds from which they may be developed, to which it is particularly applicable and which represents a specific embodiment and application of the generic invention. Some of the difficulties heretofore existing in the synthetic production of tartaric acids and their compounds may be mentioned as illustrative of difficulties in the practice of synthetic processes to which reference has been made. For example, in the electrolytic reduction of glyoxylic acid to tartaric acid special care is taken to separate the anolyte from the cathode by means of a porous diaphragm. If the anolyte is an acid, it is very difficult to use asbestos porous diaphragms, because ordinary commercial asbestos is attacked by mineral acids and this considerably complicates the process. By using a soluble chlorid as the anode liquor, this difficulty is overcome, asbestos diaphragms may be used, and the process becomes much easier and commercially practicable; but in this case chlorin is evolved as a by-product. Again, the reduction of oxalic acid to make glyoxylic acid may be accomplished by the use of potassium amalgam in the presence of a mineral acid. This potassium amalgam is most easily prepared by the electrolysis of chlorid of potassium, using a mercury cathode; but this, again, produces a considerable amount of chlorin. Chlorin cannot be led to escape and its conversion into chlorin products would in certain cases produce an amount of such substances considerably in excess of the market demand. By the process of the present invention the chlorin may be used for purposes of accomplishing oxidation and to produce hydrochloric acid, either or both of which may be availed of in the synthesis, so that the chlorid may be made to supply an agent instrumental in effecting oxidation, an agent instrumental in effecting reduction, an agent instrumental in causing the reducing agent to perform its office and is then recovered as chlorid without leaving disturbing by-products.

The application of the invention to the production of tartaric acids and their compounds gives a process for the production of tartaric acids and their compounds of exceptional purity and at a price below that at which they can now be obtained and contemplates their manufacture not only from simple carbon compounds but from carbon itself. In this process is involved a succession of reactions, some of which can be accomplished in different or alternative ways or perhaps simultaneously. For purposes of exposition, a complete series of reactions is described, beginning with those which occur in connection with the introduction of the carbon, and for convenience of reference these are given letters, which letters correspond with those on the accompanying drawing illustrating diagrammatically a concrete embodiment of the process.

(A) Carbon in any form, for instance, coke or charcoal, is introduced into a chamber or vessel provided with heating means. Into this vessel is conducted a colorless mixture of chlorin (which may be obtained later on in the process from the reaction described in B or D or E or all of them) and water, preferably in the form of steam. When this mixture is conducted over the carbon heated to about 300° C., there results hydrochloric acid and carbon monoxid or carbon dioxid or a mixture of the two carbon-oxids. In ordinary practice, a mixture of the two carbon-oxids will result, it being usually not worth while to attempt to confine the production exclusively to either one. The hydrochloric acid thus obtained may be used in some of the reactions hereinafter described either to promote said reactions or recover chlorid from their results or both. The carbon-oxids may be used in making formates, as hereinafter described in B. Commercial requirements will determine whether both the acid and the carbon-oxids shall be used in succeeding reactions or one of them disposed of otherwise.

(B) From the carbon-oxids formate may be obtained in a variety of ways. For example, the mixture of carbon monoxid and carbon dioxid may be conducted over carbon heated to about red heat, reducing the carbon dioxid in the mixture to carbon monoxid, and the carbon monoxid may be conducted over an alkali (such, for example, as caustic soda, caustic potash, or others) heated to, say, 180° to 220° C., giving a formate. Or the carbon dioxid may be reduced to formate in a way which in itself affords an illustration of the process of the present invention. Thus, water in a reaction chamber may be saturated with carbon dioxid (or the mixture of carbon-oxids containing it) and an amalgam, preferably produced by the electrolysis of a chlorid, may be caused to travel into such chamber, where it liberates hydrogen, reducing carbon dioxid to formate. It will be observed that when this method is followed the reactions embrace the electrolysis of a chlorid, giving chlorin and a reducing agent, the utilization of the chlorin to assist in oxidizing a substance and the reduction of the oxidized substance by the reducing agent. The hydrochloric acid resulting from the use of the chlorin with water (in the form of steam) to oxidize the carbon may be used to attack the amalgam, throw off the hydrogen from it for the reduction of the carbon dioxid and unite with the rest of the amalgam to form chlorid. It may under some circumstances be desirable, to use this cycle of chlorid, chlorin and amalgam, hydrochloric acid from chlorin, decomposing the amalgam to form chlorid and give off hydrogen, to reduce carbon dioxid obtained elsewhere. For example, it may be, under certain circumstances, desirable to make the chlorin react upon the carbon in the presence of water or steam so as to produce hydrochloric acid and carbon monoxid almost exclusively (which may be made in this manner of exceptional purity) and dispose of the carbon monoxid, obtaining the carbon dioxid to be reduced from some source not connected with the process. It is to be understood that such use of the cycle of reactions with the oxidizing feature of the product of the chlorid omitted is within the protection sought in some of the claims hereinafter made.

The foregoing description of the reactions which have been designated B represents various ways of treating the substance oxidized with the assistance of the chlorin obtained from the chlorid or an equivalent substance so as to obtain formate. Any convenient way may be used. The further treatment of the oxidized product may be as follows:—

(C) The formate may be transformed into oxalate in any convenient way, as by heating the formate to, say, 360° to 440° C., under pressure.

(D) The oxalate may be reduced to glyoxylate by means of an amalgam, preferably in an acid solution. This amalgam may be made by the electrolysis of a chlorid, preferably potassium chlorid, generating chlorin at the anode, which may be mixed with steam and conducted over carbon, as hereinbefore described in A. The amalgam thus produced may be caused to travel into a reaction chamber containing the oxalate and an excess of hydrochloric acid which has been obtained by conducting the mixture of chlorin and steam over carbon, as hereinbefore described in A. The amalgam, being attacked by the acid in this reaction chamber, gives off hydrogen, reducing the oxalate to glyoxylate, and, after giving off this hydrogen, combines with the hydrochloric acid to form chlorid, which remains in solution and may either be recovered at this point and again electrolyzed or allowed to pass with the glyoxylate into and through the transformation of the glyoxylate into tartrate, as hereinafter set forth.

It will be observed that the reactions described form a complete cycle, which may be summed up as follows:—

$$KCl = K + Cl$$
$$Cl_2 + H_2O + C = CO + 2HCl$$
$$K + HCl = KCl + H$$
$$CO + KOH = HCO_2K$$
$$2HCO_2K = H_2 + C_2O_4K_2 \text{ (oxalate of potassium)}$$

Oxalate of sodium in presence of an acid gives oxalic acid. The latter in presence of potassium amalgam and a strong acid gives glyoxylic acid:—

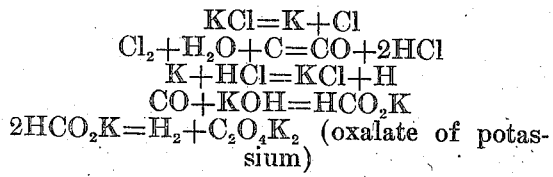

(E) The glyoxylate may be introduced in solution rendered alkaline into the cathode chamber of an electrolytic cell, the electrolyte in the anode chamber being preferably an alkali chlorid, although other soluble chlorids, even chlorid of hydrogen, may be used. When the current is caused to pass through the solution from the anode to the cathode the glyoxylate is reduced to tartrates (racemic and meso-tartrates), which are precipitated, used and worked up, as may be desired. If, as above suggested, the chlorid resulting from the reaction D has been allowed to remain in solution with the glyoxylate, it may be recovered after the tartrates have been precipitated, as, for example, by evaporation. The chlorin developed on the anode in this reaction may be used in accomplishing the oxidation of the carbon, the carbon-oxids being used to produce formates, which may be converted into oxalates, which may be converted into glyoxylates, which may be converted into tartrates, as above indicated. The alkali formed in the cathode compartment may be neutralized by the hydrochloric acid formed from the chlorin generated in the anode compartment.

The apparatus availed of in the process and in the various reactions will differ according to the particular circumstances of manufacture. In commercial practice, it will often be desirable, for example, to store temporarily the products of the various reactions, as, for instance, the formate or oxalate or acid or chlorid, before using them, or to connect the various sources of chlorin so that the making of the hydrochloric acid or the oxidation or both may be conveniently accomplished. The process contemplates that variations will be made in it according to commercial requirements. Thus, for example, in certain manufactures some of the reactions hereinbefore described may be omitted and the substances developed by such reactions obtained and introduced otherwise. For instance, a chlorid may be electrolyzed to develop amalgam and chlorin, the chlorin being used with steam and carbon to give hydrochloric acid and the acid used to liberate hydrogen from the amalgam and unite with the rest of it into chlorid, but instead of using the carbon-oxids (which may be obtained in connection with the making of the acid) through reactions producing therefrom oxalates or oxalic acid, the carbon-oxids may be disposed of otherwise and oxalic acid elsewhere obtained and introduced. The course suggested by this illustration would not be a departure from the spirit of the invention or the scope of the protection sought in some of the claims hereinafter made.

The invention has been described as embodied in a synthetic process for the manufacture of tartaric acids and their compounds from carbon and it has been pointed out that it is applicable also in the manufacture of certain compounds produced therein, as formates and glyoxylates. It is to be understood that it is applicable also in other synthetic processes.

It is particularly to be observed that in the specific embodiment of the invention applied to the manufacture of tartaric acids, the manufacture is conducted and the product obtained with practical freedom from by-products. The carbon of the coke or charcoal is caused to unite with the oxygen and hydrogen of the decomposed water, the cycle of reactions of the present invention supplying the principal ancillary substances necessary to accomplish this in such manner that practically no by-products are left.

The following claims are made:—

1. A process for the manufacture of tartaric acids and their compounds, comprising electrolyzing a chlorid and by means of said electrolysis both developing chlorin and promoting the transformations hereinafter mentioned, mixing said chlorin with water and bringing the mixture in contact with carbon thereby oxidizing the carbon and producing hydrochloric acid, transforming the carbon-oxid into a formic substance, the formic substance into an oxalic substance, the oxalic substance into a glyoxylic substance, and the glyoxylic substance into a tartaric substance, employing therein the same electrolysis aforesaid whereby said chlorin is developed, and causing the hydrochloric acid produced from said chlorin to unite with the residue from the said electrolysis to form chlorid suitable for use as aforesaid.

2. A process for the manufacture of tartaric substances, comprising electrolyzing a chlorid and by means of said electrolysis developing chlorin, bringing said chlorin and water in contact with carbon to produce carbon-oxid and hydrochloric acid, transforming the carbon-oxid into a tartaric substance by successive reductions wherein said electrolysis is employed, and causing said hydrochloric acid to unite with the residue resulting from said electrolysis to reform chlorid.

3. A process of manufacturing tartaric substances comprising developing and transforming carbon into a tartaric substance by oxidation and reduction, the oxidation being accomplished by the assistance of chlorin developed from a chlorid by electrolysis and the reduction being accomplished by means of the same electrolysis whereby the chlorin is produced.

4. A process of manufacturing tartaric substances comprising the oxidation and reduction of carbon, the oxidation being effected by a reaction between chlorin, water and carbon with the concomitant production of hydrochloric acid, the reduction being effected by the electrolysis of a chlorid whereby the chlorin is produced and the acid being used to unite with the residue resulting from the electrolysis to form chlorid.

5. In a process for the manufacture of tartaric substances by the oxidation of carbon and the subsequent transformation of the carbon-oxid, developing chlorin from a chlorid by electrolysis, conducting the chlorin with water over carbon to produce carbon-oxid, and reducing the carbon-oxid or a development thereof by means of the said electrolysis whereby the chlorin is produced.

6. In a process for the manufacture of tartaric substances by electrolytic reduction, developing chlorin from a chlorid by electrolysis, conducting the chlorin with water over carbon to produce hydrochloric acid, and causing the said acid to react with the residue from the electrolysis to form chlorin.

7. A process for organic synthesis comprising electrolyzing an alkali or earth alkali chlorid, developing an amalgam on the cathode and chlorin on the anode, conducting a mixture of the chlorin with steam over carbon to produce carbon-oxid and hydrochloric acid, utilizing the hydrochloric acid to free hydrogen from the amalgam to reduce the carbon-oxid or a development thereof and to unite with the rest of the amalgam to form chlorid.

8. A process for organic synthesis comprising electrolyzing an alkali or earth alkali chlorid developing an amalgam and chlorin, transforming the chlorin into hydrochloric acid and carbon-oxid, reducing the carbon-oxid or a development thereof by the amalgam in the presence of the hydrochloric acid and recovering the resulting chlorid.

9. A process for organic synthesis comprising electrolyzing an alkali or earth alkali chlorid developing an amalgam and chlorin, transforming the chlorin into hydrochloric acid and carbon-oxid, reducing the carbon-oxid or a development thereof by the amalgam in the presence of the hydrochloric acid.

10. A process for organic synthesis comprising electrolyzing an alkali or earth alkali chlorid developing an amalgam and chlorin, utilizing the chlorin with water and carbon to produce carbon-oxid, and reducing the carbon-oxid or a development thereof by hydrogen from the amalgam.

11. A process for organic synthesis, comprising electrolyzing chlorid to produce an amalgam and a chlorin, developing from the chlorin under suitable conditions the oxidation of a substance and an acid, and employing the amalgam in the presence of the acid to reduce the oxidized substance or a development thereof.

12. A process for organic synthesis comprising electrolyzing an alkali or earth alkali chlorid developing an amalgam and chlorin, conducting the chlorin and steam over carbon to produce hydrochloric acid and carbon-oxid, reducing the carbon-oxid or a development thereof by means of the amalgam in the presence of hydrochloric acid, separating the reduced substance and recovering chlorid.

13. A process for organic synthesis comprising developing from an alkali or earth alkali chlorid an amalgam and chlorin, utilizing the chlorin in effecting the oxidation of a substance and to produce an acid, utilizing the acid to free hydrogen from the amalgam to reduce the oxidized substance or a development thereof and to unite with the rest of the amalgam to form chlorid.

14. In a process for organic synthesis, developing chlorin from alkali or earth alkali chlorid, making hydrochloric acid from the chlorin and using the hydrochloric acid to unite with the residue of the chlorid to restore the chlorid.

15. A process for organic synthesis, comprising developing chlorin on the anode of an electrolytic cell from a chlorid introduced therein, oxidizing a substance by suitable means embracing said chlorin, and reducing said oxidized substance or a development thereof by means of the electrolysis whereby said chlorin is developed.

16. In a process for organic synthesis, developing chlorin on the anode of an electrolytic cell from chlorid introduced therein, conducting a mixture of chlorin and steam over carbon to produce hydrochloric acid, and causing the hydrochloric acid to unite with the residue left from the chlorid to restore the chlorid.

17. In a process for organic synthesis, electrolyzing a chlorid and developing chlorin, making hydrochloric acid from the chlorin, and causing said acid to unite with the residue left from the chlorid to restore the chlorid.

Signed at New York city, in the county of New York and State of New York, this 8th day of July, 1912.

LEO H. BAEKELAND.
ARNOLD H. PETER.

Witnesses:
HERMAN GUSTOW,
ALFRED M. HOUGHTON.